June 5, 1951 M. A. ELLIOTT 2,555,327
GAS ANALYZING APPARATUS
Filed Nov. 24, 1948 5 Sheets-Sheet 1

INVENTOR.
MYRON A. ELLIOTT
BY
*M. C. Hayes*
ATTORNEY

June 5, 1951

M. A. ELLIOTT 2,555,327

GAS ANALYZING APPARATUS

Filed Nov. 24, 1948

INVENTOR.
MYRON A. ELLIOTT

BY

*M. C. Hayes*

ATTORNEY

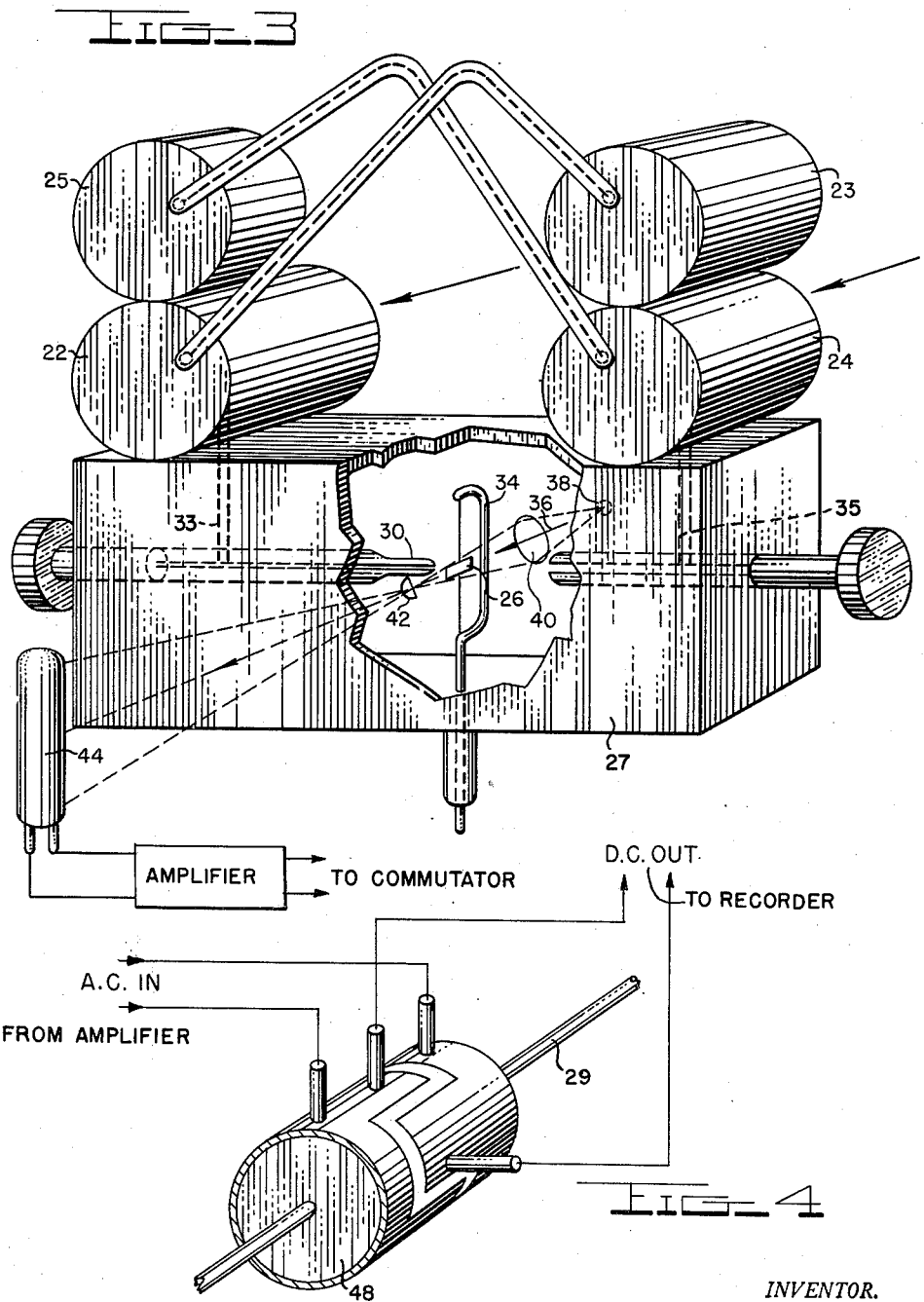

June 5, 1951
M. A. ELLIOTT
2,555,327
GAS ANALYZING APPARATUS
Filed Nov. 24, 1948
5 Sheets-Sheet 4
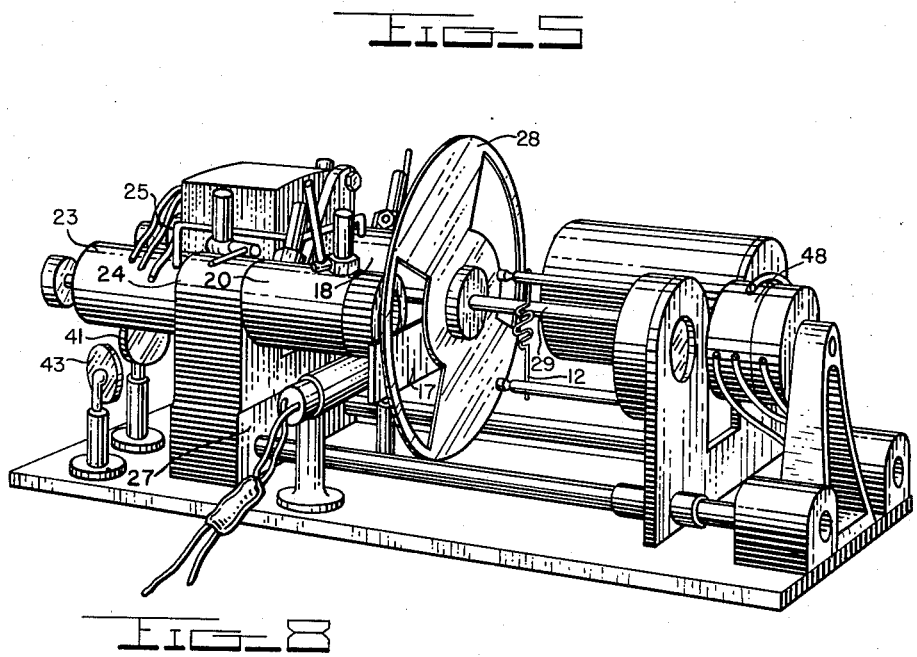
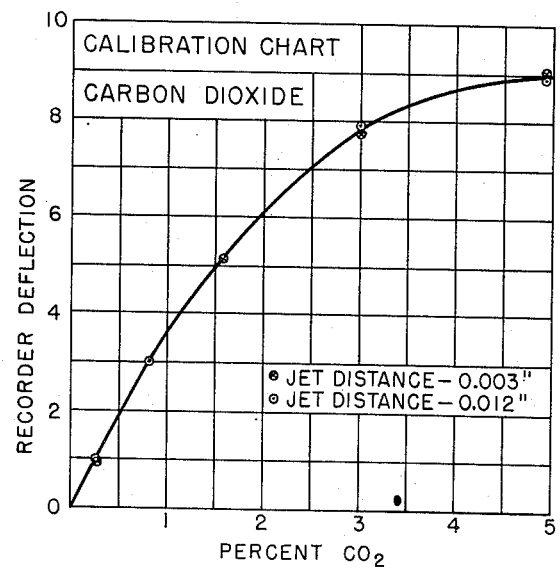
INVENTOR.
MYRON A. ELLIOTT.
BY
*M. C. Hayes*
ATTORNEY June 5, 1951  M. A. ELLIOTT  2,555,327
GAS ANALYZING APPARATUS
Filed Nov. 24, 1948  5 Sheets-Sheet 5
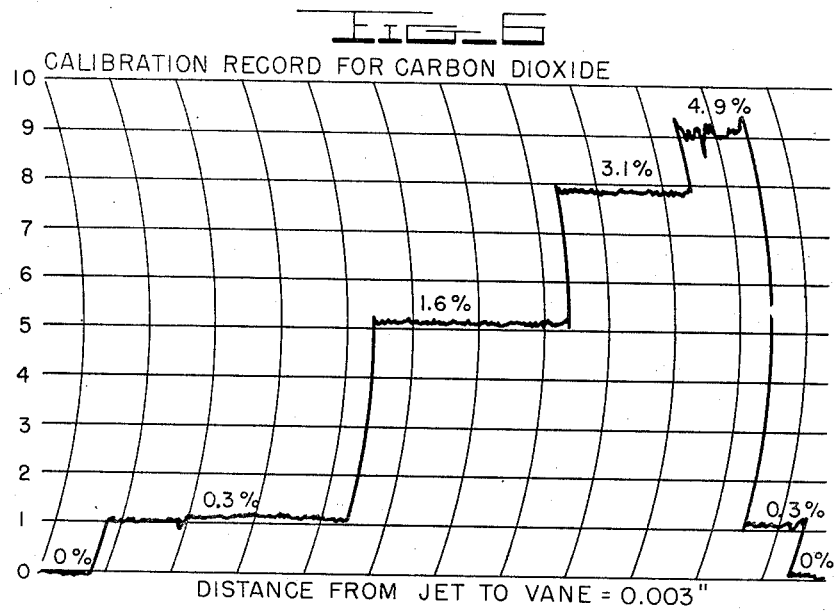
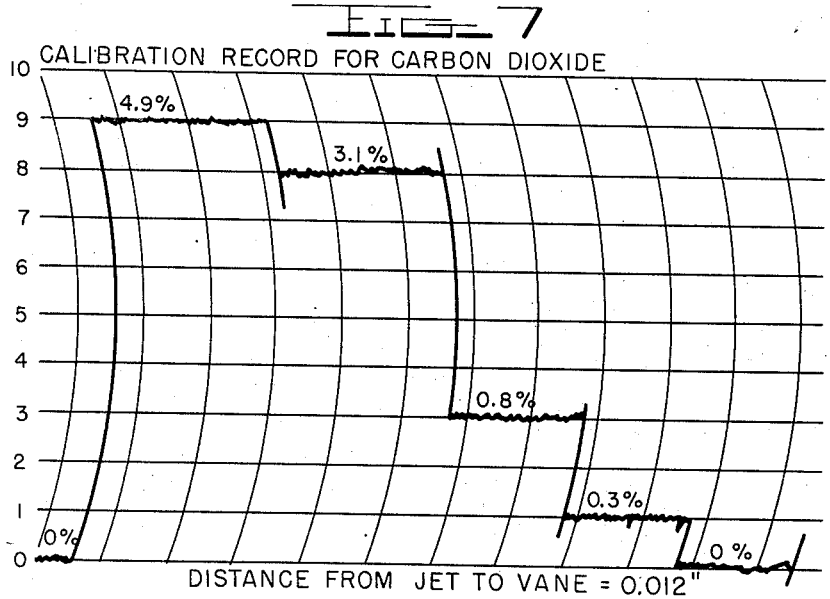
INVENTOR.
MYRON A. ELLIOTT.
BY
ATTORNEY Patented June 5, 1951

2,555,327

UNITED STATES PATENT OFFICE 2,555,327

GAS ANALYZING APPARATUS

Myron A. Elliott, Washington, D. C.

Application November 24, 1948, Serial No. 61,792

4 Claims. (Cl. 250—43)

(Granted under the act of March 3, 1883, as amended April 30, 1928; 370 O. G. 757)

This invention relates to gas analyzing apparatus of the infra-red radiation absorption type. In particular the invention relates to specific means and a method of detecting the differential absorption of infra-red radiation on two samples of equal volumes of the gas being determined.

The general object of the invention is to provide apparatus for the determination of the proportional amount of a gas present either alone or in a mixture of gases by the positive filter method.

It is a further object of the invention to provide a detecting apparatus which is relatively free from "microphonism" which introduces error in the reading of a recorder due to mechanical vibration when the detector is a diaphragm in a microphone or a capacitor positioned in a detector cell and in the tubes of the high gain amplifier.

Other objectives, such as ease of manufacture and efficiency in operation will be apparent from the following description and from the drawings which are generally a diagrammatic representation of the salient features of a preferred embodiment of the invention, and in which, Figure 1 is a plan view (partly diagrammatic) of the gas analyzing apparatus, including the amplifier and the rectifier.

Figure 3 is an isometric view, partly cut away, showing schematically the relationship of the ballasting volumes of gas to the detector cells, the chamber communicating with both detector cells, the jet orifice, the indicating device and the optical path of the beam of visible light from its source to the photoelectric cell.

Figure 4 is a diagrammatic isometric view of the commutator rectifier.

Figure 5 is an isometric view of a preferred embodiment of the gas analyzing apparatus of this invention.

Figures 6 and 7 are two calibration graphs from the recorder showing the indication with $CO_2$ mixtures of known concentration. Figure 6 is the reading with a jet to vane spacing of 0.003" and Figure 7 shows the same with a spacing of 0.012".

Figure 8 is a graph calibrating the chart readings to percentages.

The three principal types of instruments used for infra-red analysis are the infra-red spectrograph, the positive and the negative filter types of infra-red gas analyzers. The infra-red spectrograph has been widely used, but this instrument is better suited for strictly laboratory work than for plant use as it is too large and too hard to handle for general purposes. Infra-red gas analyzers of the filter type, on the other hand, are compact, reliable, and can be made to have extremely high sensitivity. Up to the present time the chief development in this country has been on the negative filter type analyzer. The reason for this is probably that the negative type uses common thermopiles or bolometers as radiation detectors, while the positive filter type requires special pressure types of gas cell detectors. The negative type has disadvantages, however, in respect to stability and sensitivity so that the development of a good positive type of filter instrument is highly desirable.

Figure 1:
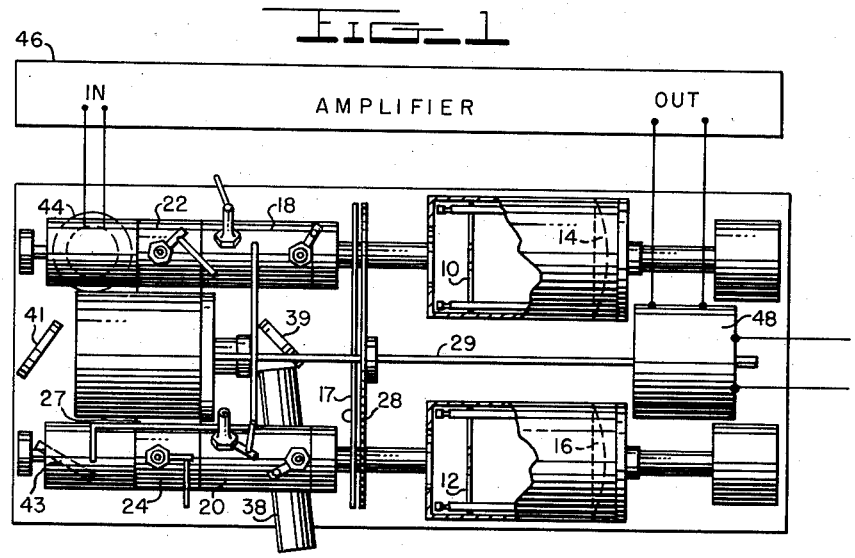
Figure 1A is a diagrammatic plan view showing an arrangement of a single source of infra-red radiation with reflecting mirrors to direct said radiation into the parallel trains of chambers.

The operating principle of the positive filter type of infra-red gas analyzer with which this invention is concerned is that the infra-red absorption of the gas component being determined is positively measured. This is shown in the drawings hereto attached to which reference is now made and in which in Figure 1 is shown a diagrammatic arrangement of the essential operating parts of the apparatus for performing gas analysis by this method. In this figure, two equal infra-red radiation sources (hot Nichrome wire spirals) are shown at 10 and 12. These sources are mounted at the focal points of mirrors 14 and 16, respectively. The radiant energy from these sources is focused through chambers 18 and 20 into the detector cells 22 and 24 respectively. Chamber 18 is the analysis chamber which contains the gas to be determined. Chamber 20 is a dummy chamber to balance chamber 18 and contains some inactive gas such as nitrogen.

Figure 1A:
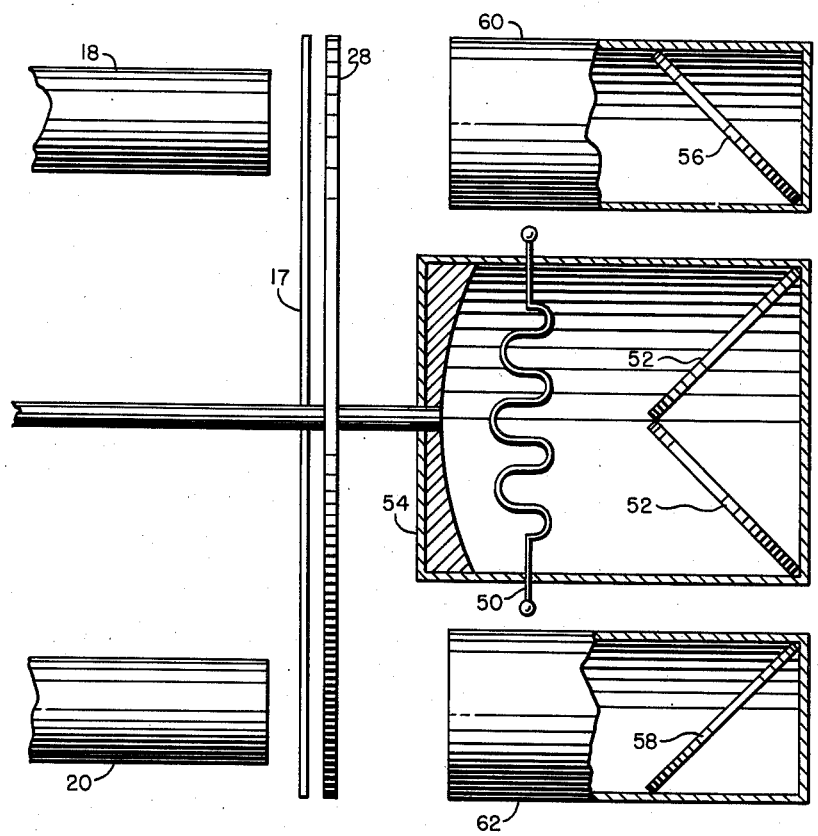

With further reference to infra-red radiation sources 10 and 12, applicant here shows a dual source of such radiation. A single source of such radiation could be used wherein the said source is symmetrically located on the longitudinal center line of the apparatus, the radiation therefrom being reflected by a split mirror to mirrors positioned to reflect said radiation into each train of chambers. This arrangement is shown by Figure 1A of the drawings wherein a single source of infra-red radiation is shown at 50. This may be a hot Nichrome wire spiral. The radiation from this source may be reflected from split mirror 52 to mirrors 56 and 58 positioned in housings 60 and 62 respectively. Concave mirror 54 reflects radiation from sourse 50 to mirror 52. The dual source of construction is preferred over the single source here described since it is more efficient and simpler in construction.

Figure 2:
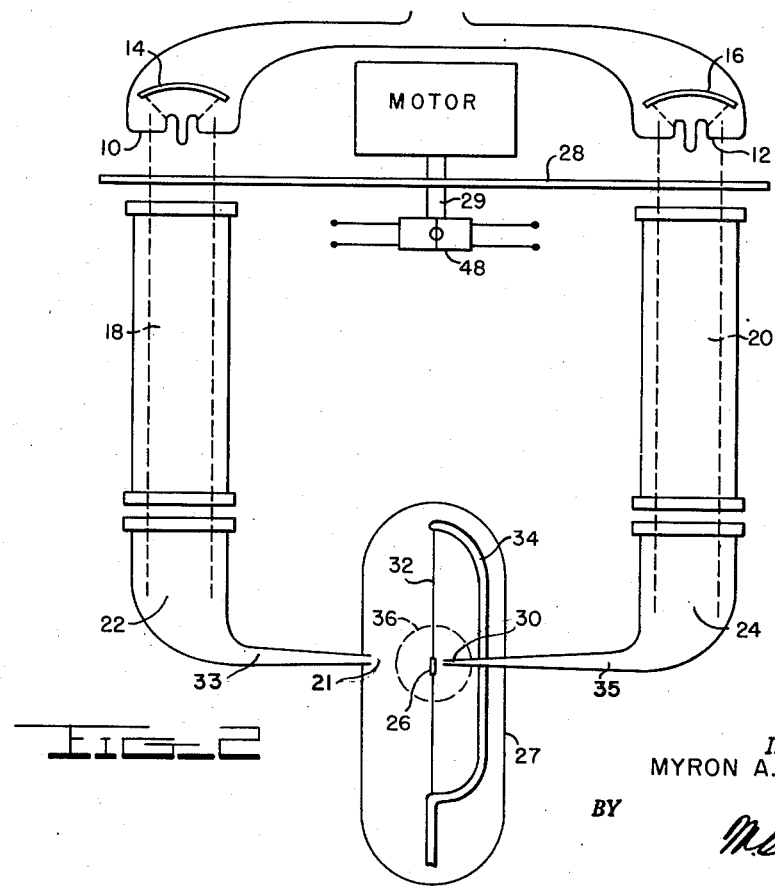
Figure 2 is a diagrammatic plan showing the relationship of the two sources of infra-red radiation to the chopper, the trains of chambers and the indicating device.

Detector cells 22 and 24 in Figure 1 are the bulbs of two gas thermometers connected by sealed chamber 27 and balanced against each other so that the pressure differential between the two due to any temperature difference is shown by indicator or vane 26 (Figures 2 and 3). Rotary disc 28 is a chopper or shutter mounted on driven shaft 29 and which interrupts the two infra-red beams simultaneously at some regular frequency, such as ten cycles per second. This chopping of the beams is important since it eliminates zero drifts caused by thermal changes in the instrument and permits stable A. C. amplification to be used on the signal from indicator 26.

Referring to Figures 2 and 3 of the drawings the indicator 26 is shown within chamber 27 at the position of rest or the zero position in relationship to jet orifices 21 and 30 in communication with detector cells 22 and 24 respectively, through conduits 33 and 35 respectively. This indicator may be any light weight material such as glass or aluminum and is rectangular in shape being about 1 mm. by 2 mm. in dimensions. Indicator 26 must be opaque and if of glass is metallized or otherwise rendered opaque and is mounted on quartz fiber 32 which is stretched across quartz glass bow 34 under a slight tension. Quartz fiber 34 is of the order of 10 microns in diameter. Indicator 26 is in fact a vane which is positioned rather close to jet orifice 30 with one of its vertical edges projecting into the line of flow of the pulsating jets of gas which issue from or enter into this jet orifice. In following the flow of these jets of gas the vane 26 is caused to rotate through an angle which varies with the magnitude of the difference in the pressures developed in detector cells 22 and 24 in synchronism with the chopped infra-red radiation. The resilience of quartz fiber 32 causes vane 26 to follow this differential very closely.

A beam of visible light 36 emanating from source 38 is concentrated on the remote edge of vane 26 by condensing lens 40. This beam of light is substantially parallel to the lateral surfaces of vane 26 when the latter is in position of rest, viz., the zero position, when the pressure pulses from both detector cells are equal and opposite. The silhouette image of the remote edge of vane 26 is projected by objective lens 42 onto photoelectric cell 44. Thus it is seen that the variation in the amount of light reaching photoelectric cell 44 will be inversely proportional to the angle of oscillation of vane 26 which at a sufficiently large angle of oscillation substantially occludes the entire field of light at the instants of maximum rotation. The pulsating direct current output of this photoelectric cell varies with the variation of the amount of light striking its sensitive surface and is therefore proportional to the percentage volume of the gas component being tested in chamber 18.

This output of photoelectric cell 44 is amplified by a conventional type of amplifier 46 tuned to ten cycles. The output of this amplifier is transformed in conventional manner to an alternating potential of about 3 to 4 volts and preferably is rectified by a commutator 48 which is adjustably mounted on chopper driving shaft 29. The phase of the amplifier output is of course in coincidence with the phase of the pulsations of infra-red radiation produced by the chopper and by advancing or retarding the commutator on shaft 29. The correct position of the commutator is determined by observing the delivery of maximum current. The rectified current is fed to a conventinal type of recorder which is adapted to record graphically the fluctuations in D. C. current received by it. These fluctuations are proportional to the percentage volume of the gas being determined in chamber 18. The rectifying commutator is shown more in detail in Fig. 4.

Figure 5 is an isometric view of the apparatus showing clearly the construction of chopper 28. The mounting of commutator 48 on shaft 29 so as to be driven in phase with chopper 28 is here illustrated. Also the positioning of reflecting mirrors 41 and 43 is shown. The positioning of mirror 39 is shown in Figure 1. The placing of these mirrors is not limitative since they merely reflect the light from the source to the photoelectric cell through chamber 27. For different positioning of the source of light and the photoelectric cell, these mirrors would, of course, be differently arranged.

Figures 6 and 7 are typical graphs obtained from the recorder in calibrating against mixtures of $CO_2$ gas of known concentration. In Figure 6 the jet orifice was spaced from the vane a distance of 0.003". In Figure 7 this spacing is 0.012". The chart user is rectangular coordinate. Since the swing of the pen in the recorder is approximately logarithmic, the chart can not indicate the true percentage composition. The absorption of infra-red radiation by a gas in a tubular chamber is apparently logarithmic. The current generated by the photoelectric cell would be logarithmic if the signal received by it varied logarithmically. The variation in the light signal received by the photoelectric cell is inversely proportional to the angle of swing of the opaque vane, i. e. to the sine of the angle of swing. The combination of these two factors prevents the output of the rectifier from being truly logarithmic.

Figure 8 is a calibration curve showing the relationship of the chart ordinates to the percentage composition. In the lower percentages the relationship is approximately rectilinear. In the higher percentages the curve departs more and more from a straight line.

In the operation of this instrument the detector cells 22 and 24 must be filled with the particular gas for which the analysis is to be made, $CO_2$ for example, and sealed in order to sensitize the instrument to this gas. When both chambers 18 and 20 are empty equal energies fall on the detector cells 22 and 24 and equal pulses are generated therein. When cells 18 and 20 are empty or filled with inactive gas the recorder should read zero. If it does not so read it is brought to zero reading by balancing the infra-red radiation as between the two cells by means moving spring biased shutter plate 17 (Figures 1 and 5) to simultaneously partly cover and uncover the entry windows of cells 18 and 20. When the infra-red radiation is thus balanced as between these two cells the recorder reads zero and the indicator 26 shows no pressure differential. If some $CO_2$ is introduced into chamber 18 some energy will be absorbed from the infra-red beam at the frequencies characteristic of the $CO_2$ molecule. This loss in energy in chamber 18 will in turn mean a loss in energy reaching detector cell 22 since this detector cell is filled with $CO_2$ and so absorbs energy at these and only these frequencies. Other gases introduced into chamber 18 which absorb at frequencies different from those of $CO_2$ will not affect the pressure pulses produced in detector cell 22 since the gas ($CO_2$) in this cell is not sensitive to these other frequencies. This is the positive filter method.

The critical spot in this positive filter analyzer is the indicator 26. In conventional positive filter types of analyzers in which the pressure differential is measured by the use of a thin metallic diaphragm stretched across the connection between two detector cells, small movements of the diaphragm can be detected electrostatically by means of an electrometer tube and an insulated plate mounted very close to the diaphragm. This type of instrument is reasonably successful but difficulty is experienced with the electrometer tube due to "microphonism" and short life, and the diaphragm is subject to "microphonism" or background noise due to vibrations. This vibration sensitivity is a serious drawback when it is desired to use the analyzer aboard submarines, aircraft or tanks.

In order to eliminate this "microphonism" or vibration sensitivity a method of indication was devised by applicant which does not require a diaphragm or electrometer tube. Instead of using a diaphragm to separate detector cells 22 and 24, the connection between them is blocked except for the small holes or jets of about 0.01" in diameter. Between these jets is mounted a very light weight vane on a fine quartz fiber. The slightest movement of gas through the jet is registered as a turning of this vane on its quartz fiber axis. Movements of the vane are recorded by a light beam and photoelectric cell arrangement. Since the vane is accurately balanced on the quartz fiber, microphonism due to the mass of the vane is eliminated. The structural details of this indicator are shown in Figure 3 of the drawings.

Another cause of microphonism is due to the fact that the gas itself has mass. If the center of gravity of the gas on each side of the jet is not at the same point, then any translational acceleration in line with the centers of gravity will introduce a pressure across the jet and will cause a disturbance to the vane. This type of microphonism can be neutralized by a proper ballasting of the cell volumes, as shown in Figure 3 of the drawings wherein the centers of gravity of the two volumes of gas in the detector cells are brought to the point of the effective center of gravity of the total gas in the detector system.

The ballasting volumes 23 and 25 are connected to volumes 22 and 24 so that the gas in the 22—23 system has the same center of gravity as that in the 24—25 system. In this manner the detector as a whole can be well enough balanced to minimize the difficulties due to vibration.

While the applicant has disclosed herein a particular embodiment of his invention in which a particular arrangement of parts for the projection of a beam of visible light across a rotatably mounted opaque vane and thence to a photoelectric cell is shown, it is not desired to be limited to this particular arrangement since many variations thereof could be made without departing from the spirit and scope of the invention. Such variations are intended to be included to the extent as defined by the claims hereto appended.

The invention described herein may be manufactured and used by or for the Government of the United States of America for governmental purposes without the payment of any royalties thereon or therefor.

What is claimed is:

1. Apparatus for detecting differences in the respective intensities of two beams of infra-red radiation comprising, a sealed connecting chamber, a pair of detector gas cells each provided with jet-orifice means, said cells being disposed with their respective jet-orifice means terminating within said chamber and spaced in opposition on a common axis, a gas absorptively sensitive to the said infra-red radiation disposed in each of said cells, an opaque low inertia vane rotatably mounted transversely to the aforesaid common axis and rotationally responsive to opposing jets of gas issuing from said jet-orifices, a light source adapted to project a beam of light positioned to contain said vane in its path, and photoelectric cell means disposed to receive light modulated by said vane and operatively responsive to the quantity of said light and thus to the rotational position of said mirror.

2. Apparatus for detecting differences in respective intensities of two beams of infra-red radition of a given wavelength comprising, a pair of detector gas cells each provided with jet-orifice means, said cells being positioned symmetrically with respect to one another with their respective jet-orifices aligned in opposition on a common axis, a sealed chamber means enclosing portions of the said jet-orifice means thereby placing said cells in communicating relation, a gas absorptively sensitive to said infra-red radiation disposed in said cells and in said chamber means, an opaque low inertia vane rotatably mounted in said chamber between said jet-orifice means and rotationally sensitive to opposing jets of gas issuing from said jet-orifices, a constant light source adapted to project a beam of light positioned to contain said vane in its path, and photoelectric cell means operatively responsive to differences in the quantity of light passed by said vane and thus to differences in the rotational position of said vane.

3. Apparatus for detecting differences in respective intensities of two beams of infra-red radiation of a given wavelength comprising, a pair of gas cells each provided with a tapered jet-orifice means, said cells being disposed to receive respectively one of said beams and being positioned symmetrically with respect to one another and with their respective jet-orifice means spaced apart and aligned in opposition, a sealed chamber means enclosing said jet-orifice means thereby placing said cells in communicating relation with each other, a gas absorptively sensitive and thermally responsive to said infra-red radiation disposed in said cells and said chamber means, an opaque low inertia vane having an area in the order of 2 square millimeters disposed in said chamber in the path of opposing jets of gas issuing from said jet-orifices into said chamber, said vane being translationally rigid but rotationally moveable by means of tensioned suspension by a torsion-resilient fiber means, a fixed constant light source adapted to project a beam positioned to contain said vane in its path and a fixed photoelectric means disposed to receive light passed by said vane and operatively responsive to the quantity of said light and thus to the rotational position of said vane.

4. Apparatus for the quantitative determination of gaseous infra-red radiation absorbing material comprising, a cell containing the gas to be determined, a cell containing a standard gas, means for transmitting equal quantities of infra-red radiation absorbable by the gas to be determined through each of said cells, and a detecting apparatus comprising a pair of detector gas cells each provided with a jet-orifice means, said detector cells being positioned symmetrically with respect to one another and with their respective jet-orifice means aligned in registry, a sealed chamber means enclosing the said jet-orifice means thereby placing said detector cells in communicating relation, a gas absorptively sensitive to said infra-red radiation disposed in said detector cells and in said chamber means, an opaque low inertia vane rotatably mounted in said chamber in the line of registry of said jet-orifices and rotationally sensitive to differences in pressure of gas issuing from said jet-orifices, a constant light source adapted to project a beam of light positioned to contain said vane in its path, and photoelectric cell means operatively responsive to differences in the quantity of light passed by said vane and thus to differences in the rotational position of said vane.

MYRON A. ELLIOTT.

REFERENCES CITED

The following references are of record in the file of this patent:

UNITED STATES PATENTS

| Number | Name | Date |
|---|---|---|
| 1,999,023 | Sharp et al. | Apr. 23, 1935 |
| 2,269,674 | Liddel et al. | Jan. 13, 1942 |
| 2,420,159 | Wineman | May 6, 1947 |
| 2,435,519 | Tolson | Feb. 3, 1948 |
| 2,443,427 | Kidder et al. | June 15, 1948 |